US011524441B2

(12) United States Patent
Duclos (10) Patent No.: US 11,524,441 B2
(45) Date of Patent: Dec. 13, 2022

(54) PRODUCTION OF CONTAINERS WITH RECYCLING BY TWIN-SCREW EXTRUDER

(71) Applicant: SIDEL PARTICIPATIONS, Octeville-sur-Mer (FR)

(72) Inventor: Yves-Alban Duclos, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 13 days.

(21) Appl. No.: 16/957,097

(22) PCT Filed: Dec. 12, 2018

(86) PCT No.: PCT/FR2018/053226
§ 371 (c)(1),
(2) Date: Jun. 22, 2020

(87) PCT Pub. No.: WO2019/122609
PCT Pub. Date: Jun. 27, 2019

(65) Prior Publication Data
US 2020/0346384 A1 Nov. 5, 2020

(30) Foreign Application Priority Data
Dec. 22, 2017 (FR) ...................................... 1762976

(51) Int. Cl.
*B29C 48/405* (2019.01)
*B29C 49/06* (2006.01)
(Continued)

(52) U.S. Cl.
CPC .......... *B29C 49/06* (2013.01); *B29B 17/0026* (2013.01); *B29C 48/405* (2019.02);
(Continued)

(58) Field of Classification Search
CPC . B29B 17/0026; B29B 17/00; B29C 49/0005; B29C 49/28; B29C 49/06;
(Continued)

(56) References Cited

U.S. PATENT DOCUMENTS 6,054,092 A * 4/2000 Nishikawa ............ B29C 49/482
264/516
6,479,003 B1 * 11/2002 Furgiuele ................ B29B 17/04
264/211.21
(Continued)

FOREIGN PATENT DOCUMENTS

| DE | 10050295 A1 | 4/2002 |
|---|---|---|
| EP | 2585273 A1 | 5/2013 |
| FR | 2564374 A1 | 11/1985 |

OTHER PUBLICATIONS

International search report dated Apr. 8, 2019.

*Primary Examiner* — Monica A Huson (57) ABSTRACT

The invention relates to the manufacture of hollow objects made of plastics material by way of an extruder. In order to improve the quality of the manufactured objects and the regularity of manufacture, the extruder that is fed at least with the initial metered quantity and to which at least a part of the molded blanks and/or of the molded and heated blanks used for manufacturing said objects and/or of the finally manufactured objects will be recycled is a twin-screw extruder.

7 Claims, 5 Drawing Sheets

(51) Int. Cl.
  *B29B 17/00* (2006.01)
  *B29C 49/00* (2006.01)
  *B29C 49/28* (2006.01)
  B29K 67/00 (2006.01)
  B29L 31/00 (2006.01)

(52) U.S. Cl.
  CPC .......... *B29C 49/0005* (2013.01); *B29C 49/28* (2013.01); *B29K 2067/003* (2013.01); *B29L 2031/7158* (2013.01)

(58) Field of Classification Search
  CPC ........... B29C 48/405; B29C 2049/001; Y02W 30/62; B29K 2067/003; B29L 2031/7158
  See application file for complete search history.

(56) References Cited

U.S. PATENT DOCUMENTS

| | | |
|---|---|---|
| 6,745,492 B1 | 6/2004 | Haesendonckx |
| 2006/0284334 A1 | 12/2006 | Band |
| 2018/0134438 A1* | 5/2018 | Felix Araujo ....... B29C 49/4273 |

* cited by examiner

PRODUCTION OF CONTAINERS WITH RECYCLING BY TWIN-SCREW EXTRUDER

The invention relates to the manufacture of containers made of plastics material by way of an extruder.

In order to manufacture for example bottles, it is known to work in batches, via a blow-molding operation, which is a method for shaping thermoplastic polymer materials, such as polyethylene terephthalate (PET), by molding.

The process comprises two phases:
- on the basis of the fluid plastics material used, a blank is formed, typically a tube, which is extruded from plastic;
- then, in a blow mold, a compressed gas (such as air) is injected into the blank formed, which has been heated beforehand. The material stretches, is pressed against the mold cavity and conforms to the shape thereof.

After cooling, the mold is opened and the part ejected.

Nowadays, it is known practice, in order to manufacture hollow objects, such as containers, made of plastics material by way of an extruder:
- to meter respective quantities of virgin plastics material and additives in order to obtain a metered mixture,
- to feed the extruder at least with the metered mixture in order to obtain an extruded mixture,
- to mold the extruded mixture in order to obtain molded blanks,
- to heat the molded blanks so that they can be blow-molded,
- to blow-mold the heated blanks in order to convert them into hollow objects,
- between at least some of the successive steps of molding, heating and blow-molding, to check the quality of the molded blanks and/or of the heated blanks and/or of the blow-molded hollow objects,
- if a predefined quality threshold has been reached, to pass to the next step, and if not, to recycle at least a part of the molded blanks and/or of the heated blanks and/or of the blow-molded hollow objects to an extruder, after they have been ground.

The quality of the PET is generally measured by two indicators:
- the acetaldehyde (AA) content: The process of melting and conversion into the molten phase generates acetaldehyde in the PET. This is a residue that is detrimental to the production of beverage packaging, the acetaldehyde conferring a flavor (apple juice) on the beverage. Acetaldehyde is associated with oxidation reactions, hence the need to carry out the synthesis in the absence of air, or with hydrolysis reactions, hence the need to dry the raw material. The acetaldehyde content increases very rapidly with temperature or with the residence time in the machines in the molten state: 0.5 under normal conditions, 4 after 1 minute at 280° C.
- the viscosity index (VI): The VI is an index that characterizes the mechanical properties of PET. The higher the index, the longer the chains of the polymer and the better the mechanical properties thereof; unfortunately, the more expensive it is and the harder it is to work.

By way of example, the viscosity index for water: 0.74 to 0.78 dl/g (in order to reduce the generation of acetaldehyde), and that for CSD: 0.82 to 0.86 dl/g (for good integrity of the bottle at the pressure of the beverages).

Moreover, the processes of melting and conversion into the molten phase deteriorate this index, and excessive deterioration makes the use of PET unsuitable for its end use.

Furthermore, it has been found that, in practice, the use of an extruder is not very compatible with quality production with an industrial throughput of hollow objects to be molded and blow-molded, such as PET bottles.

One problem arises from the poor compatibility between:
- the need for continuous operation of the extruder, which is associated in particular with the maintenance of a substantially constant temperature of the plastics material in the extruder,
- and the frequent stoppages that occur on the production line, which are associated for example with congestion or a fault in a device of the line.

In its most common version, with a single screw, the basic principle of extrusion is the use of a single worm screw, which rotates inside a cylindrical barrel. The plastics material supplied passes through a die. The main functions of the method are therefore ensuring the melting of the solid polymer and then the pressurizing and mixing of the molten polymer in order to feed the die.

However, while it is virtually impossible to eliminate all of these stoppages by anticipation, extrusion remains an effective technique for preparing material to be supplied to the production line, since, by conveying the initially provided polymer with melting and pressurization, an extruder makes it possible, if operation is good, to obtain a regular flow rate at the outlet of the machine, with a homogeneous material at a controlled temperature and under high flow-rate conditions, with relatively limited energy consumption.

It is in this context, and therefore to favor operational compatibility between an upstream extruder and a downstream production line with an industrial throughput for containers to be molded and blow-molded, such as PET bottles, that this document proposes that the extruder for plastic, which is therefore fed at least with the abovementioned metered mixture and to which at least a part of the molded blanks and/or of the heated molded blanks and/or of the abovementioned blow-molded containers is recycled, is a, preferably corotating, twin-screw extruder.

The choice of corotating twin-screw extruders will favor the flow rates (high throughput line), a self-cleaning nature (no thermoplastic material—PET—stagnating in the extruder), and good mixing (homogenization of the thermoplastic material—PET—and the additives). The residence time is relatively long, but additional devices can correct the problem that this can generate (for example via a vacuum pump, see below).

Thus, instead of single-screw extrusion, the material will be conveyed by two screws, generally parallel, that rotate inside a barrel with a figure of eight-shaped cross section.

As regards the benefit of twin-screw extruders compared with single-screw extruders, the following has already been noted in the past:
- an increased mixing capacity on account of the interpenetration of the screws and the diversity of available screw elements (counterflights, kneading disks, etc.) which allow better control of the degree of shearing/mixing in terms of intensity and quality,
- increased flexibility of the processes on account of the independence of the flow rate and the speed of the screws and the capacity to manage several process functions in series (melting, mixing, curing, degassing, cooling, etc.) in a single extruder,
- better control of the process parameters: smaller spread of the residence times, shear rates and deformation, better heating by friction, more precise control of the temperature profiles in the extruder and of the input of mechanical energy, a process productivity that is potentially more favorable by virtue of the positive pump effect of the screws, the possibility of managing a wider range of raw materials and formulations, the effect of screw wear compensation by adjusting the screw speed, economic returns and commercial potential that are greater on account of greater flexibility and better productivity of the processes which make it possible to manufacture a wider range of finished products, and to convert more varied raw materials.

In addition to these arguments which initially led to interest in this type of extruder, it has been found, surprisingly but supported by analyses and tests, that joining a preferably corotating twin-screw extruder to a production line for producing containers by molding and then blow-molding blanks that have been heated in the meantime makes it possible to effectively, durably and economically solve the blow-molding problems encountered in line that were deemed to be associated with other causes inherent to blow-molding (cycle time, throughputs, pressures, etc.).

In this regard, one of the advantages of a molding/blow-molding combination is a saving in energy associated with the heating of the blanks that emerge hot from the molding operation and can thus be directly blow-molding, via mild thermal conditioning.

However, it has become apparent that at least a part of the blow-molding problems actually arose from variations in quality of the molded blanks. In particular, variations in weight have been identified as being causes.

Following further investigation, it has been found that, in the case of transitory production phases involving fairly frequent successive starts and stops, with variations in the melting point of the plastics material conveyed being generated, on average and in distribution, these variations bring about variations in quality of the blanks, in particular in terms of weight.

With different masses, the blanks are molded slightly differently, resulting in differences in processing during blow-molding and in the containers obtained, this being able to result in excessive reject rates.

In particular on account of its abovementioned control of the process parameters, the use of a preferably corotating twin-screw extruder has therefore been found to be an advantageous solution, as confirmed by subsequent tests.

In this case, the flight of one of the screws will penetrate to a greater or lesser extent into the channel of the adjacent screw.

Another problem taken into account was the problem associated with the current conditions of recycling rejected products.

Specifically, the known processes for manufacturing containers, such as PET bottles, by molding and blow-molding eject unsuitable articles and recycle them to the (usually single-screw) extruder according to a complicated pattern. The blanks and the manufactured containers of poor quality are collected and ground, and then the chips are introduced into a second extruder and a pellet die. The pellets are crystallized in order to be able to be subsequently recycled on the production line, via the first extruder. Typically, they pass back into the initial metering device in order to be metered with the virgin plastics material and the additives so as to obtain said metered mixture intended for the extruder.

Moreover, before being actually (re)extruded, the crystallized pellets from the recycling line are typically preheated in a dedicated machine, and then delivered by a second mechanical feed screw to two hoppers, in order to be dried by hot air therein. It is only then that the plastic is deposited at the inlet of the metering device.

Depending on the moisture content of the PET, the drying time lasts from 2 hours to 6 hours. Drying reduces the concentration of initial aldehyde. However, it has been found that the moisture content and the use of a single screw generated acetaldehyde.

Thus, with a single-screw extruder, the abovementioned steps are required, since they are necessary for limiting the generation of acetaldehyde. However, furthermore, dryers do not accept chips of plastics material (in particular PET) that are not crystallized, there otherwise being a risk of an agglomeration of pellets being produced.

The use of a preferably corotating twin-screw extruder avoids these problems and constraints, and so this document proposes advantageously recycling at least a part of the molded blanks and/or of the heated blanks and/or of the blow-molded hollow objects directly to the extruder without passing through said metering step or another extruder.

Moreover, the twin-screw extruder takes all PET states without any risk of malfunction, and for a similar result: crystallized PET, amorphous PET, bioriented PET, in particular.

In addition, it is possible to introduce PET with moisture into said twin-screw extruder without requiring an inert atmosphere (such as nitrogen). The reactions that generate acetaldehyde will if necessary be inhibited by the use of a vacuum pump connected to the barrel of the twin-screw extruder: vents. These vacuum pumps will make it possible to eliminate air, in particular oxygen. They will also make it possible to eliminate water, much more rapidly than dryers, by lowering the vaporization pressure and raising the temperature.

Consequently, without taking precautions in relation to the quality of the PET at the inlet, the molten PET will have the same quality as when a single-screw extruder is used under good conditions (drop in the viscosity index of −0.02 dl/g and an acetaldehyde content of 1 ppm).

The recycling of reject preforms and containers (bottles for example) could bring about a drop in the viscosity index of −0.08 dl/g. These rejects could be mixed with metering of 10% recycled material to 90% virgin material in order to have a drop in the viscosity index of 0.02 dl/g).

The pumping devices on the extruder could be involved in the evacuation of acetaldehyde while the PET is being worked in the molten state, by virtue of means, preferably mating means, for vacuum, temperature and kneading of the PET (for maximizing the diffusion area of the acetaldehyde).

If, as is frequently the case, the recycled articles (blanks or blow-molded hollow objects) comprise additives in their composition, recycling them as chips at the inlet of the twin-screw extruder will have no effect on the metering of the virgin material, since the recycling circuit opens out downstream of the metering device.

Moreover, it has been found that such recycling with a twin-screw extruder limits in particular the problems of deterioration of the material, especially because the twin-screw extruder itself deteriorates this material less than when a single-screw extruder is on the line.

This document also proposes, in order to recycle at least a part of these blanks and/or blow-molded hollow objects:
  grinding said blanks and/or hollow objects to be recycled in order to obtain ground material, which could be in the form of chips,
  then, before the twin-screw extruder is fed with the ground material, storing the ground material in a (at least one) buffer silo and metering ground material from the buffer silo and said metered mixture into the respective feed flows of the extruder.

The silo will act as a buffer zone for storing and then releasing the ground material to the maximum extent, in the quantity required in the twin-screw extruder, while the line is at a standstill and thus the feed to the extruder is stopped. The plastics material recycled will thus be diluted in the virgin mixture and metered, without requiring the abovementioned recycling line or needing to pass beforehand into the inlet metering device, which is thus reserved just for the virgin mixture.

All the above could also apply, entirely or in part, to a situation for producing and packaging containers, wherein:
  these containers will be manufactured in the same way, as explained above, as the hollow bodies,
  then the containers that are not recycled will be collected and at least one of the following operations will be carried out therewith or thereon: filling, capping, labeling, bundling,
  with, of course, initial use of the abovementioned twin-screw extruder.

If necessary, the invention will be understood even better and further features, details and advantages thereof will become more apparent from reading the following description, which is given by way of nonlimiting example and with reference to the appended drawings, in which.

Figure 2:
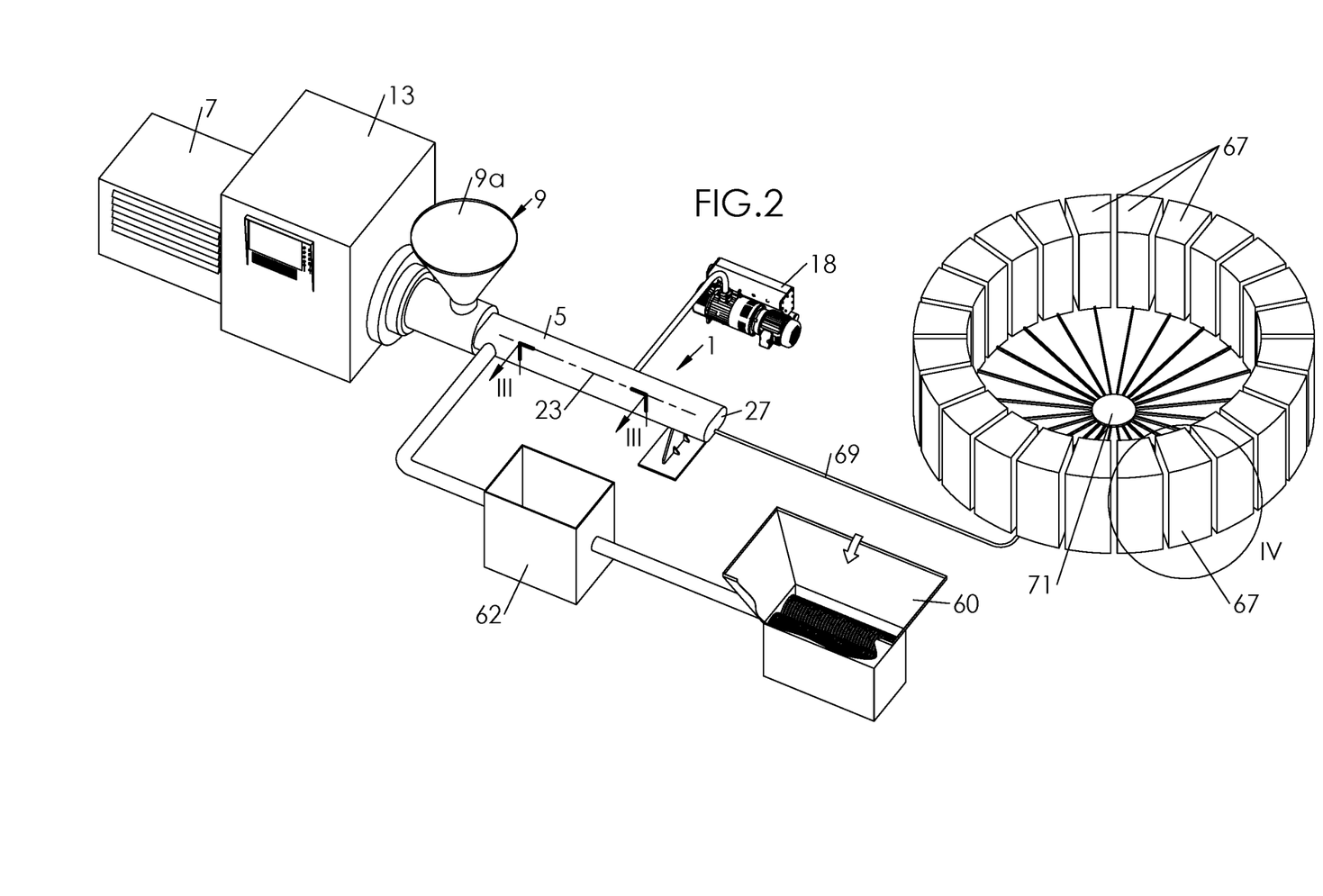
FIG. 2 is a schematic view of a twin-screw extruder followed by a blank molding machine using the material output by the twin-screw extruder.
Figure 3:
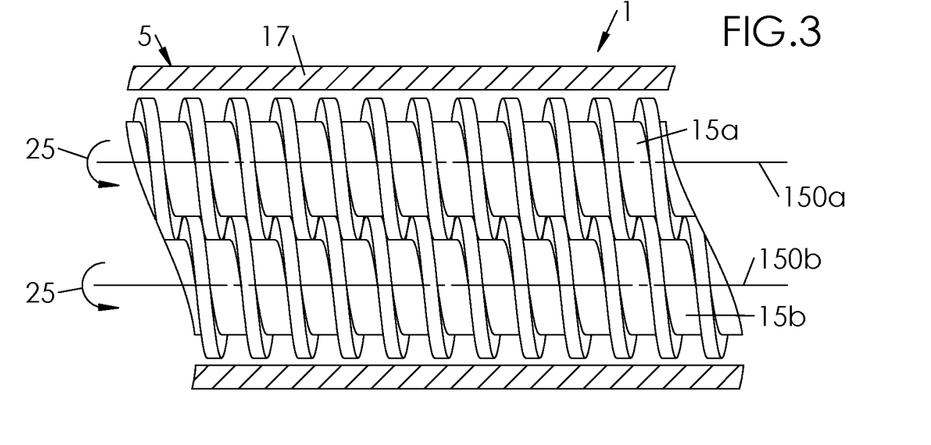
FIG. 3 is a detail view schematically depicting the screws of the extruder in FIG. 2 (section III-III)

FIGS. 2 and 3 therefore illustrate a twin-screw extruder.

In the example of a twin-screw extruder 1 presented, the following parts are assembled on a single frame (FIG. 2):
  a screw-barrel assembly 5 with its heating and cooling accessories;
  a drive unit 7 comprising an assembly that may comprise a reduction gear, a torque divider and a limiter, and a main motor;
  devices 9 for feeding material (metering hopper in particular) or for processing same (for example a degassing device);
  and, for driving the extruder, a control cabinet 13 which contains the motor speed regulators, the starting and safety members, and the regulating, control, display and measuring devices.

The frame may be a simple support for the above members; but it may also have a device for opening the barrel allowing access to the screws for cleaning, inspection or maintenance.

The screw-barrel assembly (15a, 15b, 17 FIG. 3) forms the active part and carries out the processing of the material, namely extrusion. The barrel 17 forms the outer casing thereof. The materials to be processed, and any additives, such as fillers, are introduced therein through a main feed orifice (9a on the feed devices 9 having a metering hopper FIG. 2) and optionally secondary orifices, by virtue of metering devices for solids or pumps for liquids. The temperature of the barrel is regulated by connecting the latter to a heater, generally an electric heater, via heating elements spaced out along the longitudinal axis 23 of the machine, parallel to which the two parallel axes of the two screws 15a, 15b extend (FIG. 3).

The heating elements are controlled by temperature sensors, with a cooling device, typically with water circulation.

Inside the barrel 17, the two parallel screws 15a, 15b (FIG. 3) thus rotate, which receive the material and move it forward.

Other shaping devices can also be used.

The screws 15a, 15b are driven by a gearbox, coupled to the screws in a separating lantern ring. This gearbox can reduce the speed, distribute the torque between the two screws and take up axial thrust forces of the screws.

The reactions that generate acetaldehyde will, if necessary, be inhibited by the use of a vacuum pump 18 connected to the interior of the barrel 17 of the twin-screw extruder 15a, 15b. The vacuum pump 18 makes it possible to eliminate the air, in particular the oxygen, therein. It also makes it possible to eliminate the water that can be contained in the material supplied in the twin-screw extruder, by lowering the vaporization pressure and raising the temperature therein.

The drive unit 7, in particular an electric drive motor, is typically a variable-speed, DC or frequency-variation motor, and is connected to the gearbox by way of a safety coupling having a torque limiter.

Given the desired application, and especially the expected advantages (see above), the use of a twin-screw extruder having interpenetrating corotating screws is recommended here, as schematically depicted in FIG. 3.

The two screws rotate in the same direction 25 about respective parallel axes 150a, 150b and the flights of one penetrate between the flights of the other. The schematic depiction is not intended to represent reality.

Figure 1:
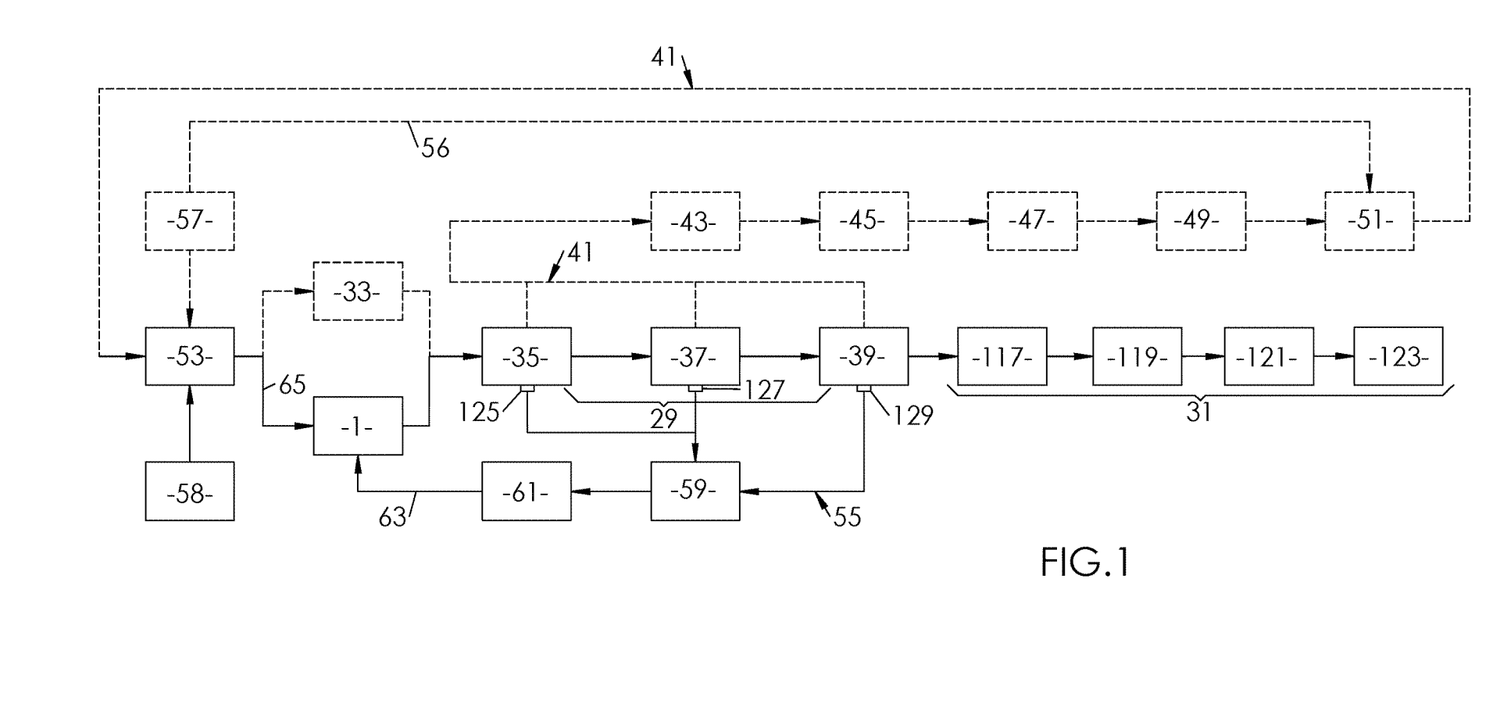
FIG. 1 shows the (main) steps in manufacturing and then packaging containers using a solution according to the invention (solid lines) and to the prior art (dashed lines, with a single-screw extruder)

Such an extruder will make it possible to continuously supply the plastics material to the line 29 for producing or forming containers, or subsequently to the line 31 for packaging the formed containers, as schematically depicted in FIG. 1, which therefore shows two scenarios: by way of dashed lines, a prior art solution in which a single-screw extruder 33 is used, and by way of solid lines, a solution that is able to be implemented with a twin-screw extruder 1 according to the invention, it being noted that the line 29 for producing containers is common to both solutions.

Specifically, and even though this will be returned to later on in the description, the production line 29 successively comprises, in both cases, a step 35 of molding preforms, a step 37 of heating these molded preforms, and step 39 of blow-molding the preforms thus heated, in order to obtain the expected containers.

Figure 5:
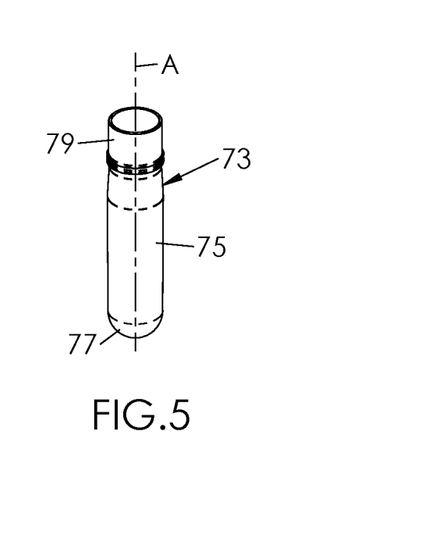
FIG. 5 is a detail of the location V in FIG. 4 schematically depicting a blank, in particular a bottle preform, thus produced.

It is conceivable that in at least some, or even each, of these steps, there may be rejects, which will then be recycled to the extruder 1, 33 in question, it being noted that the term preform or blank in this case covers both a preform as presented in connection with FIG. 5 and an intermediate container that has already undergone a preforming operation for example into a bottle-like shape.

In the same way, even though the present description refers frequently to containers, in particular bottles, it relates to any hollow body obtained from a blank and by way of a (at least one) blow-molding operation.

Furthermore, it has been assumed here that polyethylene terephthalate (PET) or polypropylene (PP) is used, and thus recycled, as plastics material, even though other plastics materials could be used.

In the prior art solution, the recycling line 41 (dashed lines) successively comprises a step 43 of grinding the preforms or the formed containers, a step 45 of passing into a second single-screw extruder, a step 47 of pelletizing the material extruded in step 45, a step 49 of crystallizing the pelletized material, and a step 51 of drying the crystallized pelletized material, after which the dried crystallized material is introduced into the metering device 53 which, as the case may be, corresponds to that of the single-screw extruder 33 (prior art) or to the feed device 9 having an inlet metering hopper of the twin-screw extruder 1 in the solution of the invention that can be implemented with such an extruder. In the drying apparatus in step 51, virgin plastics material 57 can be added to the mixture, via the line Of course, it will be understood that FIG. 1 illustrates a conceptual view in that the solutions of the invention, with a twin-screw extruder, and of the prior art, with a single-screw extruder, are not intended to coexist with one and the same production line 29, or packaging line 31, the same going for the recycling lines: 41 according to the prior art (dashed lines), 55 according to the invention (solid lines). Either the prior art solution or a solution according to the invention will be encountered.

Introduced typically into the metering device 53, which is situated just upstream of or at the inlet of the extruder in question, are virgin plastics material 57 and additives 58, such as colorants or fillers that modify certain starting properties of the material, etc.

In the prior art solution, recycled material from the line 41 is thus also introduced there.

This is a drawback, since it is then necessary to again meter the proportions of these constituents before feeding the single-screw extruder 33 therewith. Moreover, it has been shown that the recycling according to the prior art requires numerous steps, including drying the crystallized pellets (typically with hot air), this all being necessary in order to limit the generation of acetaldehyde, the dryers not accepting plastics chips that are not crystallized, there otherwise being the risk of an agglomeration of pellets being produced.

The solution with a corotating twin-screw extruder avoids in particular these problems and constraints, since the recycling line 55, which can receive material to be recycled from all or some of the steps 35 of molding preforms, 37 of heating these molded preforms and/or step 39 of blow-molding the preforms thus heated in order to convert them into containers, comprises a grinding step 59, or even a subsequent step 61 of passing the ground material from the grinding step 59 into a silo.

The grinding step 59 could be carried out in a known grinding device 60, where the ground material could consist of chips or flakes of PET (see FIG. 2).

Regarding step 61 of passing into silo(s), this could consist in passing the abovementioned ground material into one or more homogenizing silos 62 which will stir the material as it is added. The material could then be conveyed to one or more quality control silos. Depending on the result, the chips or flakes of PET will be stored in the feed silo of the extruder 1.

It is at the inlet 9a of the feed device 9 having a hopper that the respective quantities or flow rates feeding the twin-screw extruder, with ground material 63 for the one part and with said metered "virgin" mixture 65 for the other, could then be adjusted.

Besides then avoiding the abovementioned recycling line 41, including prior passage through the inlet metering device 53, keeping only virgin mixture in store since the ground PET has already been premetered with additives 58, the twin-screw extruder 1 having two corotating screws will allow intimate kneading of the recycled ground material (flakes or chips, inter alia) and of the metered "virgin" mixture 65.

The twin-screw extruder 1 will ensure transport of the plastics material through the effect of the positive displacement of the interpenetrating screws, which act like a gear pump. Solid transport can be effected in the absence of complete filling of the channels of the screws. An advantage is that better decoupling between two setting parameters of the extruder, namely the outlet temperature of the material and the feed mass flow (equal to the speed of rotation of the screws), is obtained.

Another feature is the speed of the melting mechanism allowed by this extruder. A few centimeters may suffice to pass from the solid pellets to a completely molten material. In a corotating system, as recommended here, it will also be possible to obtain a high capacity of intimate mixing, and therefore to limit the problems of deterioration of the material (the viscosity index and the acetaldehyde content).

A brief description will now be given of what steps 35, 37, 39, and then those of the line 31 for packaging the formed containers, could consist of.

Figure 4:
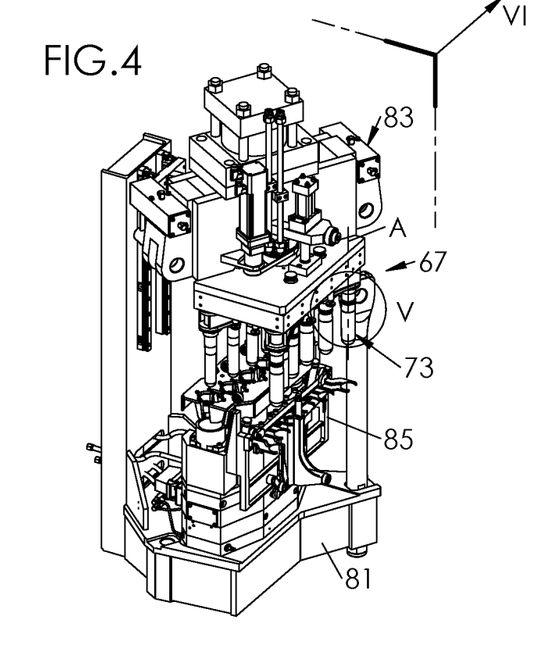
FIG. 4 is a cutaway at the location IV of the blank molding machine schematically depicted in FIG. 2.

FIG. 4 schematically depicts a unit 67 for molding preforms 73 the implementation of the molding step 35.

The outlet 27 of the twin-screw extruder 27 communicates with a conduit 69 connecting the extruder to an inlet of a rotary joint 71, which ensures the distribution of the material from the extruder to a series of molding machines or units 67, only one of which is shown in FIG. 4.

Each hollow preform 73 to be molded therein could comprise in particular, as shown in FIG. 5, a hollow body 75 that is substantially in the form of a cylinder of revolution about an axis A, closed by a for example hemispherical dome 77, and provided with an open neck 79 in the continuation of the body, on the opposite side from the dome. The neck 79 ends with an annular surface defining a mouth for the container that will be formed from the preform 73.

Each molding unit 67 comprises a mount 81 by way of which the unit is mounted on the supporting structure of a carousel 83 and a mold carrier 85.

Figure 6:
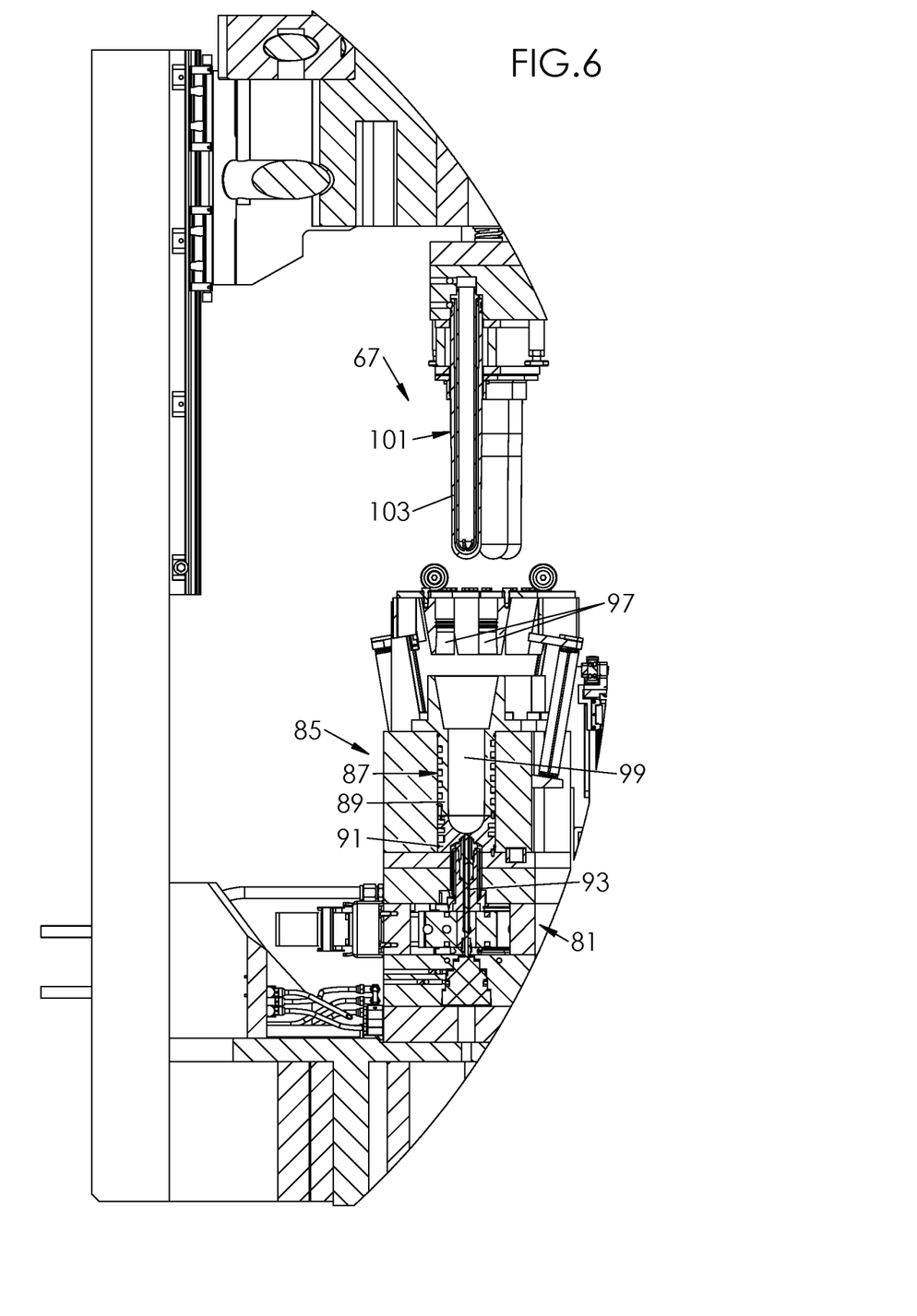
FIG. 6 shows, in a local section VI through FIG. 4, a part of the interior of the molding machine in that figure, in the region of a mold therein.

As is shown in FIG. 6, the mold carrier 85 comprises at least one mold body 87, and a priori several mold bodies 87, having a cylindrical side wall 89 and a bottom 91 that together define a cavity with the impression of an external face of the body 75 of the preform, and a system 93 for injecting material into each mold body 87.

The mold carrier furthermore comprises slides, each mounted so as to be movable with respect to the mold carrier between a demolding position, in which the (or each) half-ring 97 is spaced apart from the cavity 99 of the corresponding mold body, and a molding position, in which the (or each) half-ring 97 is housed in this cavity.

The molding unit 67 also comprises a mobile assembly including a carriage mounted in a movable manner with respect to the mount 81, and a core carrier 101 mounted on the carriage in a rotatable manner with respect thereto. The core carrier 101 carries at least one pair of cores that are spaced apart from one another, each having the impression of an internal face of the body 75 of a preform 73.

The abovementioned carriage is mounted so as to be movable in translation with respect to the mount between:
    a molding position, in which each core, such as 103, is housed in a mold body 87,
    and a demolding position, axially offset (as in FIG. 6) with respect to the molding position, and in which the core is axially spaced apart from the mold body.

The preforms 73 to be produced will thus be able to be obtained by injecting a plastics material (such as PET in this case) into the mold having the impression of the preform formed by the mold body 87 and the core 103. The material is injected between the mold body and the core, which is then removed to allow the ejection of the preform (FIG. 6). This technique is described in the European patent application EP 2 585 273.

Figure 7:
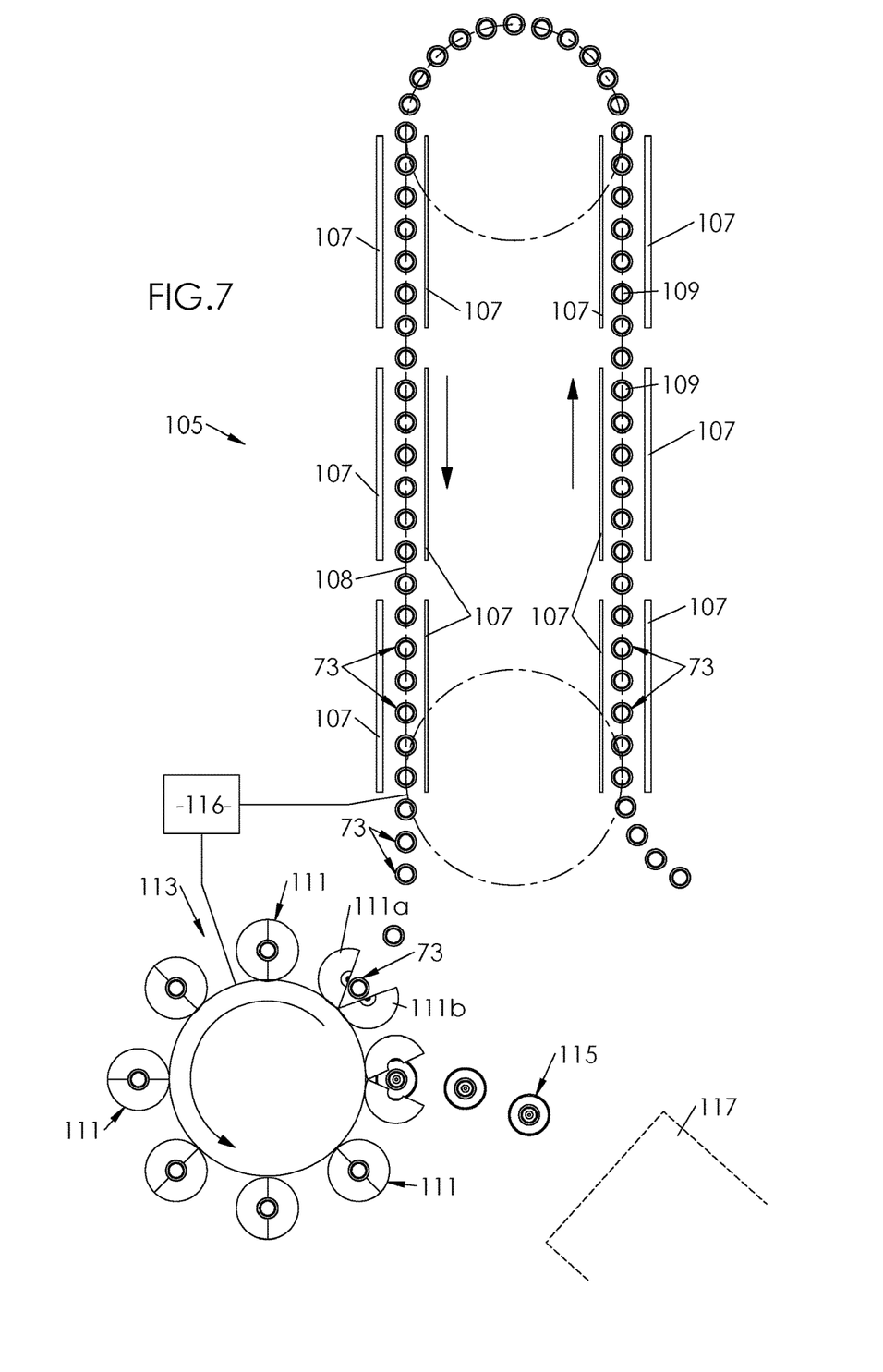
FIG. 7 schematically depicts a furnace for heating blanks output by the molding machine in FIG. 2, the furnace being followed by a machine for blow-molding containers from the blanks thus (pre)heated.

On leaving the molding machine(s) or unit(s) 67, the preforms 73 or blanks will enter, immediately or otherwise, a furnace 105, which may be the one depicted schematically at the top of FIG. 7 and in which these blanks will be heated to a temperature higher than the glass transition temperature of the material (around 80° C. in the case of PET). The blanks run therein in front of a row of heat sources 107 emitting for example infrared radiation, which are coupled to rotating supports or "spinners" mounted on a chain 108 driven in rotation. Each spinner is driven in rotation about an axis 109.

It is in this furnace 105 that the molded preforms will be heated.

Regarding step 39 of blow-molding the preforms thus heated, this will be effected in a mold 111 of a molding or blow-molding machine 113, which may be the one depicted schematically at the bottom of FIG. 7.

In each mold 111, a compressed gas (such as air) will be injected into each hot blank formed: the material will then stretch, be pressed against the impression and conform to the shape thereof.

After cooling, the mold is opened and the molded part 115, corresponding to the intended container, is ejected.

In each mold 111 in question, the preforms 73 are blow-molded or stretch-blow-molded, with possible pre-blow-molding, during which a pressurized fluid (generally a gas, usually air) will be injected into the hot preform in order to give it the final shape of the container, or hollow object, 115.

As illustrated in FIG. 7, a blow mold can comprise two parts 111a, 111b that are movable with respect to one another, usually in a linear manner or in a hinged manner (solution schematically depicted), between two positions, respectively closed, about a preform, and open, to allow a preform to enter or exit. In the closed position, each cavity defined by the two molding parts forms the impression of the final container 115.

It should be noted that, in each mold 111, the preform 73 or the blank loaded may undergo:
    either blow-molding, converting it into the final container 115,
    or stretch-blow-molding, which is typically stretching of the blank, before blow-molding, by axial insertion of a hollow elongating rod into the blank, bearing against the bottom of the blank so as to make it easier to axially elongate this blank,
    there being a possibility of pre-blow-molding in both cases, during which the blanks are blown at a first pressure at the blow-molding pressure.

A computer unit 116 controls and coordinates in particular the movements and displacements in the furnace 105 and the molding or blow-molding machine 113.

Once manufactured in this way, the containers 115 could, again directly or otherwise, be transferred to the packaging line 31 (FIG. 1).

Typically, this line 31 will comprise, downstream of the machine 113, a filling unit 117 (or filler), associated with a capping unit 119, and/or optionally a labeling unit 121 and/or a bundling unit 123 (for example a shrink-wrapping machine).

If they exist:
    the filling unit 117 (or filler) receives containers 115 and fills them. It may include a unit for rinsing the containers 115 before they are filled, which is provided with arms that inject a rinsing solution, for example chlorinated, into the containers in order to wash them and also to disinfect them. The rinsing water is collected in a collection vessel;
    the capping unit 119 places and closes caps on the filled containers 115;
    the labeling unit 121 places and sticks labels on the bodies of the containers 115 that may have been filled and capped beforehand; and
    the bundling unit 123 groups together a set of containers 115 that may have been filled and capped and/or labeled beforehand and secures them together, with a tie that typically covers them and grips them, such as a heat-shrink film.

The solution having been provided, it will be understood finally:
    that the production of the twin-screw extruder 1 in terms of quantity of material, quality of material (homogeneity and plasticity in particular) and regularity of production has an influence on the quality and quantity of blanks exiting the furnace 105 and thus on those of the containers 115 formed at the outlet of the machine 113,
    but also that simplifying and making it easier to recycle rejects from the machines or units 67, 105, 113 will also be important for these criteria, if only by accelerating this recycling by eliminating in particular the requirement for drying crystallized ground material or chips (at least for PET).

As noted above, it is thus the case that, between at least some of the successive steps of molding 35, heating 37 and blow-molding 39, and thus on the machines 67, 105 and 113, respectively, the quality of the molded blanks, heated molded blanks, and blow-molded hollow bodies or containers, respectively, is checked so as to define whether they should be recycled into the circuit 55 or should be considered ready for use.

This is known and schematically depicted in FIG. 1 by the control units 125, 127 and 129, respectively.

For these checks, it may be possible for example to detect by radiation and/or weighing:
    at the outlet of each mold of the unit 67, the equilibrium of the blank,
    at the outlet of the furnace 105, the thickness profile of the blanks, or their temperature using a sensor,
    and at the outlet of the blow mold 113, the equilibrium of the formed bodies or containers 115.

In each case, a minimum quality threshold per criterion (shape, weight, etc.) will have been predefined and input into the memory of the computer unit 115 which also controls these control units of the line 29.

If the threshold in question has been reached, the object will pass to the next production and/or packaging step. If not, automated systems that are a priori also controlled by the computer unit 116 will remove the rejects from the chain or line in question for recycling to the twin-screw extruder 1, via the circuit 55, for the defective object 73, 115, at the step in question (35, 37 or 39).

The invention claimed is:

1. A method for manufacturing hollow objects made of plastics material by way of an extruder, the method comprising steps in which:
   respective quantities of virgin plastics material and additives are metered in order to obtain a metered mixture,
   the extruder (1) is fed at least with the metered mixture in order to obtain an extruded mixture,
   the extruded mixture is molded in order to obtain molded blanks (73),
   the molded blanks are heated so that they can be blow-molded,
   the heated blanks are blow-molded in order to convert them into hollow objects,
   between at least some of the successive steps of molding, heating and blow-molding, the quality of the molded blanks and/or of the heated blanks (73) and/or of the blow-molded hollow objects (115) is checked,
   if a predefined quality threshold has been reached, the method passes to the successive step, and if not, a rejected portion of the molded blanks and/or of the heated blanks and/or of the blow-molded hollow objects is recycled to the extruder (1), after the rejected portion(s) undergoes a grinding operation,
   wherein:
   the extruder (1) that is fed at least with the metered mixture and to which the rejected portion(s) is recycled is a twin-screw extruder,
   said molded blanks and/or heated blanks and/or blow-molded containers or hollow objects to be recycled are ground in the grinding operation in order to obtain ground material,
   the ground material, before being fed to the twin-screw extruder, is stored in at least one buffer silo (61) and ground material from the buffer silo and said metered mixture (65) are metered into the respective feed flows of the extruder.

2. A method for producing and conditioning containers made of plastics material by way of an extruder, the method comprising steps in which:
   respective quantities of virgin plastics material and additives are metered in order to obtain a metered mixture,
   the extruder (1) is fed at least with the metered mixture in order to obtain an extruded mixture,
   the extruded mixture is molded in order to obtain molded blanks,
   the molded blanks are heated so that they can be blow-molded,
   the heated blanks are blow-molded in order to convert them into containers,
   the containers are collected and at least one of the following operations is carried out therewith or thereon: filling, capping, labeling, bundling,
   between at least some of the successive steps of molding, heating and blow-molding, the quality of the molded blanks and/or of the heated blanks and/or of the blow-molded containers (115) is checked,
   if a predefined quality threshold has been reached, the method passes to the successive step, and if not, a rejected portion of the molded blanks and/or of the heated blanks and/or of the blow-molded hollow objects is recycled to the extruder (1), after the rejected portion(s) undergoes a grinding operation,
   wherein:
   the extruder (1) that is fed at least with the metered mixture and to which the rejected portion(s) is recycled is a twin-screw extruder,
   said molded blanks and/or heated blanks and/or blow-molded containers or hollow objects to be recycled are ground in the grinding operation in order to obtain ground material,
   the ground material, before being fed to the twin-screw extruder, is stored in at least one buffer silo (61) and ground material from the buffer silo and said metered mixture (65) are metered into the respective feed flows of the extruder.

3. The method as claimed in claim 1, wherein the twin-screw extruder (1) that is used is an interpenetrating corotating twin-screw extruder.

4. The method as claimed in claim 1, wherein the rejected portion(s) of the molded blanks and/or of the heated molded blanks and/or of the blow-molded containers or hollow bodies (115) is recycled directly to the twin-screw extruder (1) without passing through said metering step (53) or another extruder.

5. The method as claimed in claim 2, wherein the twin-screw extruder (1) that is used is an interpenetrating corotating twin-screw extruder.

6. The method as claimed in claim 2, wherein of the rejected portion(s) of the molded blanks and/or of the heated molded blanks and/or of the blow-molded containers or hollow bodies (115) is recycled directly to the twin-screw extruder (1) without passing through said metering step (53) or another extruder.

7. The method as claimed in claim 3, wherein of the rejected portion(s) of the molded blanks and/or of the heated molded blanks and/or of the blow-molded containers or hollow bodies (115) is recycled directly to the twin-screw extruder (1) without passing through said metering step (53) or another extruder.

* * * * *